United States Patent
Yoon et al.

(10) Patent No.: US 11,259,261 B2
(45) Date of Patent: *Feb. 22, 2022

(54) METHOD AND APPARATUS FOR TRANSMITTING AND RECEIVING UPLINK SIGNALS IN A WIRELESS COMMUNICATION SYSTEM

(71) Applicant: LG Electronics Inc., Seoul (KR)

(72) Inventors: Sukhyon Yoon, Seoul (KR); Hyunsoo Ko, Seoul (KR); Kijun Kim, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 507 days.

This patent is subject to a terminal disclaimer.

(21) Appl. No.: 16/300,459

(22) PCT Filed: Jun. 25, 2018

(86) PCT No.: PCT/KR2018/007154
§ 371 (c)(1),
(2) Date: Nov. 9, 2018

(87) PCT Pub. No.: WO2018/236197
PCT Pub. Date: Dec. 27, 2018

(65) Prior Publication Data
US 2021/0136713 A1 May 6, 2021

Related U.S. Application Data

(60) Provisional application No. 62/523,785, filed on Jun. 23, 2017.

(51) Int. Cl.
*H04W 56/00* (2009.01)
*H04L 27/26* (2006.01)
(Continued)

(52) U.S. Cl.
CPC ... *H04W 56/0045* (2013.01); *H04L 27/26025* (2021.01); *H04W 72/0413* (2013.01); *H04W 72/0453* (2013.01); *H04W 74/0833* (2013.01)

(58) Field of Classification Search
CPC ......... H04W 56/0045; H04W 74/0833; H04W 72/0453; H04W 72/0413; H04L 27/26025
See application file for complete search history.

(56) References Cited

U.S. PATENT DOCUMENTS

| | | | |
|---|---|---|---|
| 6,286,104 B1 * | 9/2001 | Buhle | H04L 63/105 |
| | | | 707/999.009 |
| 10,602,470 B2 * | 3/2020 | Yoon | H04W 80/02 |

(Continued)

FOREIGN PATENT DOCUMENTS

| | | |
|---|---|---|
| CN | 106134263 | 11/2016 |
| EP | 2804439 | 11/2014 |

(Continued)

OTHER PUBLICATIONS

Ericsson, "Requirements for NR UE timing advance", 3GPP TSG-RAN WG4 Meeting NR#2 Ad Hoc, R4-1706716, Qingdao, China, Jun. 27-29, 2017, 4 pages (Year: 2017).*

(Continued)

*Primary Examiner* — Brian T O Connor
(74) *Attorney, Agent, or Firm* — Fish & Richardson P.C.

(57) ABSTRACT

A method for allowing a user equipment (UE) and a base station (BS) to transmit and receive uplink (UL) signals in a wireless communication system is disclosed.

6 Claims, 8 Drawing Sheets

(51) Int. Cl.
  *H04W 72/04* (2009.01)
  *H04W 74/08* (2009.01)

(56) References Cited

U.S. PATENT DOCUMENTS

| | | | |
|---|---|---|---|
| 10,893,551 B2 * | 1/2021 | Islam | ................ H04L 27/2602 |
| 2014/0092812 A1 | 4/2014 | Jang et al. | |
| 2015/0003427 A1 | 1/2015 | Wan et al. | |
| 2016/0165631 A1 | 6/2016 | Gao et al. | |
| 2016/0323070 A1 | 11/2016 | Chen et al. | |
| 2017/0055234 A1 | 2/2017 | Seo et al. | |
| 2017/0079028 A1 | 3/2017 | Dinan | |
| 2020/0288503 A1 * | 9/2020 | Sahlin | ................ H04W 72/04 |
| 2020/0314909 A1 * | 10/2020 | Irukulapati | ....... H04W 74/0833 |

FOREIGN PATENT DOCUMENTS

| | | |
|---|---|---|
| KR | 20140130164 | 11/2014 |
| KR | 20160035027 | 3/2016 |
| RU | 2496265 | 10/2013 |
| WO | WO2012153993 | 11/2012 |
| WO | WO2017079530 | 5/2017 |

OTHER PUBLICATIONS

Ericsson, "4-step random access procedure", 3GPP TSG-RAN WG1 NR Ad Hoc #2, R1-1711383, Qingdao, China, Jun. 27-30, 2017, 17 pages (Year: 2017).*

Qualcomm Incorporated, "Timing advance for different numerology", 3GPP TSG-RAN WG1 NR Ad Hoc #2, R1-1711208, Qingdao, China, Jun. 27-29, 2017, 1 page (Year: 2017).*

Russian Office Action in Russian Application No. 2019110456, dated Mar. 20, 2020, 15 pages (with English translation).

Ericsson, "Requirements for NR UE timing advance," R4-1706716, 3GPP TSG-RAN WG4 Meeting NR#2 Ad Hoc, Qingdao, China, Jun. 27-29, 2017, 4 pages.

CATT, "NR RACH Preamble Format for capacity enhancement," R1-1710033, 3GPP TSG RAN WG1 NR Ad-Hoc#2, Qingdao, P.R. China Jun. 27-30, 2017, 28 pages.

NTT Docomo, Inc., "Discussion on 4-step random access procedure for NR," R1-1708443, 3GPP TSG RAN WG1 Meeting #89, Hangzhou, P.R. China May 15-19, 2017, 7 pages.

Ericsson, "4-step random access procedure," R1-1711383, 3GPP TSG-RAN WG1 NR Ad-Hoc#2, Qingdao, China, dated Jun. 27-30, 2017, 16 pages.

Japanese Office Action in Japanese Application No. 2019-558323, dated Aug. 11, 2020, 4 pages (with English translation).

Qualcomm Incorporated, "Timing advance for different numerology," R1-1711208, 3GPP TSG-RAN WG1 NR AdHoc #2, Qingdao, China, dated Jun. 27-30, 2017, 1 pages.

United States Office Action in U.S. Appl. No. 16/284,749, dated Aug. 2, 2019, 10 pages.

EP Extended European Search Report in European Appln. No. 18819856.8, dated Feb. 19, 2021, 8 pages.

Ericsson, "Timing advance for TDD NR," R4-167639, 3GPP TSG-RAN WG4 Meeting #80bis, Ljubljana, Slovenia, dated Oct. 10-14, 2016, 4 pages.

IN Office Action in Indian Appln. No. 201927006914, dated Jan. 22, 2021, 8 pages (with English translation).

ITRI, "Considerations of DMRS Enhancement in the High Doppler Case for V2V Services based on L TE Sidelink," R1-160663, 3GPP TSG RAN WG1 Meeting #84, St. Julian's, Malta, Feb. 15-18, 2016, 7 pages.

CN Office Action in Chinese Appln. No. 201880027924.7, dated Mar. 24, 2021, 20 pages (with English translation).

* cited by examiner (a)                                    (b)

METHOD AND APPARATUS FOR TRANSMITTING AND RECEIVING UPLINK SIGNALS IN A WIRELESS COMMUNICATION SYSTEM

CROSS-REFERENCE TO RELATED APPLICATIONS

This application is a National Stage application under 35 U.S.C. § 371 of International Application No. PCT/KR2018/007154, filed on Jun. 25, 2018, which claims the benefit of U.S. Provisional Application No. 62/523,785, filed on Jun. 23, 2017. The disclosures of the prior applications are incorporated by reference in their entirety.

TECHNICAL FIELD

The following description relates to a wireless communication system, and more particularly to a method and apparatus for transmitting and receiving an uplink signal.

BACKGROUND ART

As many more communication devices have required higher communication capacity, the necessity of the enhanced mobile broadband (eMBB) communication much improved than the legacy radio access technology (RAT) has increased. In addition, massive machine type communication (mMTC) capable of providing various services at anytime and anywhere by connecting a number of devices or objects to each other has been considered in the next generation communication system.

Moreover, a communication system design capable of supporting services/UEs sensitive to reliability and latency has been discussed. The introduction of the next generation RAT considering the eMBB communication, mMTC, Ultra-reliable and low latency communication (URLLC), and the like has been discussed.

DISCLOSURE

Technical Problem

An object of the present disclosure devised to solve the problem lies in a method for more efficiently adjusting uplink synchronization in a wireless communication system.

In particular, it is another object of the present disclosure to provide a method for more efficiently determining a timing advance (TA) value in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with one aspect of the present disclosure, a method for transmitting an uplink signal by a user equipment (UE) in a wireless communication system includes receiving a random access response (RAR) message including a first timing advance (TA) command, determining a first timing advance (TA) value for transmitting a first uplink signal based on the first TA command and a subcarrier spacing of an uplink channel to be initially transmitted after reception of the random access response (RAR) message, and transmitting the first uplink signal according to the first TA value.

An exemplary embodiment of the method may further include receiving a downlink channel including a second timing advance (TA) command, determining a second TA value for transmitting a second uplink signal based on the second TA command, and transmitting the second uplink signal according to the second TA value, and if the UE has a plurality of uplink bandwidth parts, the second TA value is determined based on a largest value among subcarrier spacing values of the plurality of uplink bandwidth parts and the second command.

In an exemplary embodiment of the method, when the second uplink signal is transmitted in an uplink bandwidth part which has a subcarrier spacing smaller than a subcarrier spacing used for determining the second TA value among the plurality of uplink bandwidth parts, the second TA value is determined by rounding-off a value indicated by the second TA command based on a basic unit of a TA value.

In accordance with another aspect of the present disclosure, a user equipment (UE) for transmitting an uplink signal in a wireless communication system includes a transceiver and a processor. The processor is configured to control the transceiver to receive a random access response (RAR) message including a first timing advance (TA) command, determine a first timing advance (TA) value for transmitting a first uplink signal based on the first TA command and a subcarrier spacing of an uplink channel to be initially transmitted after reception of the random access response (RAR) message, and control the transceiver to transmit the first uplink signal according to the first TA value.

An exemplary embodiment of the processor is further configured to control the transceiver to receive a downlink channel including a second timing advance (TA) command, determine a second TA value for transmitting a second uplink signal based on the second TA command, and transmit the second uplink signal according to the second TA value. If the UE has a plurality of uplink bandwidth parts, the second TA value is determined based on a largest value among subcarrier spacing values of the plurality of uplink bandwidth parts and the second TA command.

An exemplary embodiment of the method may further include determining a basic unit of a timing advance (TA) value based on the subcarrier spacing of the uplink channel to be initially transmitted after reception of the random access response (RAR) message, and the first TA value may be determined based on the basic unit of the TA value and the first TA command.

The first TA value may be in proportion to a value indicated by the first TA command, and may be in inverse proportion to the subcarrier spacing.

Advantageous Effects

As is apparent from the above description, the embodiments of the present disclosure may more efficiently adjust uplink (UL) synchronization in a wireless communication system.

The embodiments of the present disclosure may more efficiently determine a timing advance (TA) value in a wireless communication system.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
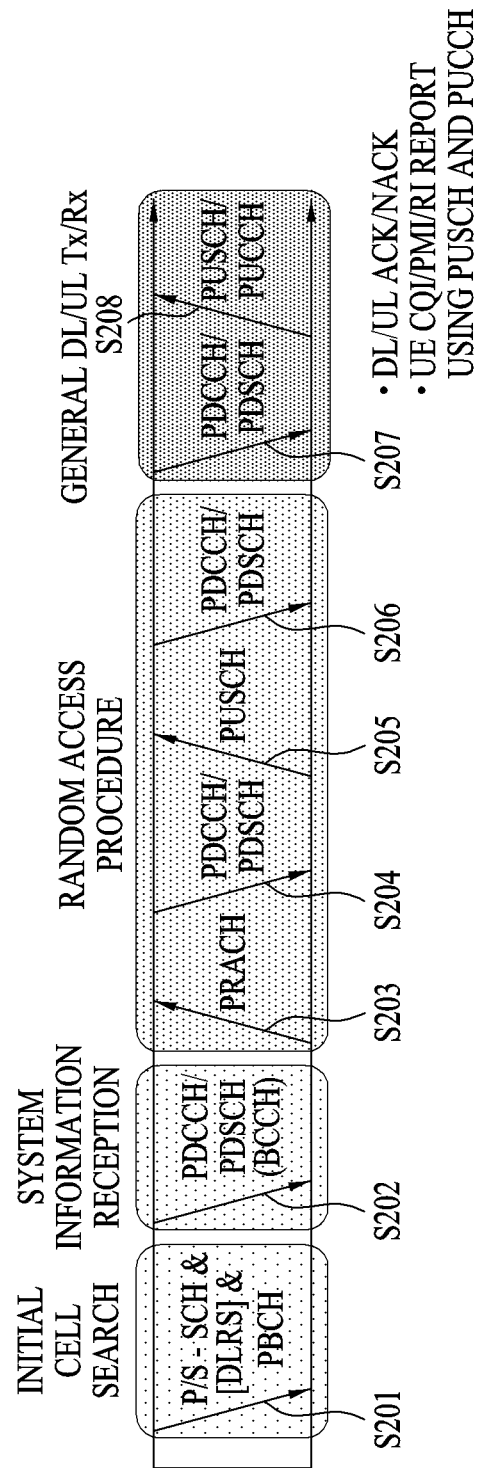
FIG. 1 is a view illustrating physical channels and a general signal transmission method using the physical channels in a 3GPP system.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The detailed description, which will be given below with reference to the accompanying drawings, is intended to explain exemplary embodiments of the present disclosure, rather than to show the only embodiments that can be implemented according to the disclosure.

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present disclosure described hereinbelow are combinations of elements and features of the present disclosure. The elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

Terms to be used in this application are defined as follows.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device.

In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS). Specifically, a base station (BS) of UTRAN will hereinafter be referred to as Node-B, a base station (BS) of E-UTRAN will hereinafter be referred to as eNB, and a base station (BS) of a new radio access technology network will hereinafter be referred to as gNB.

Techniques, devices, and systems described herein can be used in various wireless multiple access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), Multi-Carrier Frequency Division Multiple Access (MC-FDMA), etc.

CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, Evolved-UTRA (E-UTRA), etc.

UTRA is a part of Universal Mobile Telecommunication System (UMTS) and $3^{rd}$ Generation Partnership Project (3GPP) Long Term Evolution (LTE) is a part of Evolved UMTS (E-UMTS) using E-UTRA. 3GPP LTE employs OFDMA for downlink and SC-FDMA for uplink. LTE-A is an evolution of 3GPP LTE. For the sake of clarity, it is assumed that the present disclosure is applied to 3GPP communication systems, for example, LTE/LTE-A systems, NR (New Radio Access Technology) system, etc. However, the technical features of the present disclosure are not limited thereto. For example, while the following detailed description is given under the assumption that a 3GPP communication system is being used as a mobile communication system, the description is applicable to any other mobile communication system except for specific features inherent to the 3GPP LTE/LTE-A/NR systems.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals.

An RS is a signal with a predefined special waveform known to both a gNode B (gNB) and a UE, and may also be referred to as a pilot. For example, cell specific RS, UE-specific RS (UE-RS), positioning RS (PRS), and channel state information RS (CSI-RS) are defined as DL RSs.

The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal.

In the present disclosure, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

For the terms and techniques which are used herein but not specifically described, 3GPP LTE/LTE-A standard documents, for example, 3GPP TS 36.211, 3GPP TS 36.212, 3GPP TS 36.213, 3GPP TS 36.321 and 3GPP TS 36.331 may be referenced, and 3GPP NR standard documents, for example, 3GPP TS 38.211, 3GPP TS 38.212, 3GPP 38.213, 3GPP 38.214, 3GPP 38.215, 3GPP TS 38.321 and 3GPP TS 38.331 may also be referenced.

FIG. 1 illustrates physical channels and a general method for transmitting signals on the physical channels in the 3GPP system.

Referring to FIG. 1, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed. As described above, the introduction of the next generation RAT considering the enhanced mobile broadband communication, massive MTC, Ultra-reliable and low latency communication (URLLC), and the like has been discussed.

In the current 3GPP, many developers and companies are conducting intensive research into the next generation mobile communication system after EPC. The next generation mobile communication system after EPC may be referred to as a new RAT (NR) system, a 5G RAT system, or a 5G system. For convenience of description, the next generation mobile communication system after EPC will hereinafter be referred to as an NR system.

Higher and superior performances better than those of the legacy 4G system in terms of a data rate, capacity, latency, energy consumption, and energy costs should be supplied to the NR system. Therefore, it is necessary for the NR system to be significantly evolved in various fields, i.e., a bandwidth, spectral, energy, signaling efficiency, and cost-per-bit reduction.

The NR system may use the OFDM transmission scheme or other similar transmission methods. For example, the NR system may use numerologies shown in the following Table 1.

TABLE 1

| Parameter | Value |
| --- | --- |
| Subcarrier-spacing (Δf) | 60 kHz |
| OFDM symbol length | 16.33 us |
| Cyclic Prefix (CP) length | 1.30 us/1.17 us |
| System BW | 80 MHz |
| No. of available subcarriers | 1200 |
| Subframe length | 0.25 ms |
| Number of OFDM symbol per Subframe | 14 symbol |

The NR system may be based on OFDM parameters of the LTE system and other parameters. Alternatively, the NR system may be based on numerologies of the legacy LTE/LTE-A without change, and may have a larger system bandwidth (e.g., 100 MHz) as compared to the legacy LTE/LTE-A. In addition, the NR system may allow one cell to support a plurality of numerologies. That is, in the NR system, UEs operating in different numerologies may coexist in one cell.

In the 3GPP LTE/LTE-A system, a radio frame is 10 ms (307200 Ts) long, including 10 equal-size subframes (SFs). The 10 SFs of one radio frame may be assigned numbers. Ts represents a sampling time and is expressed as Ts=1/(2048*15 kHz). Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

Figure 2:
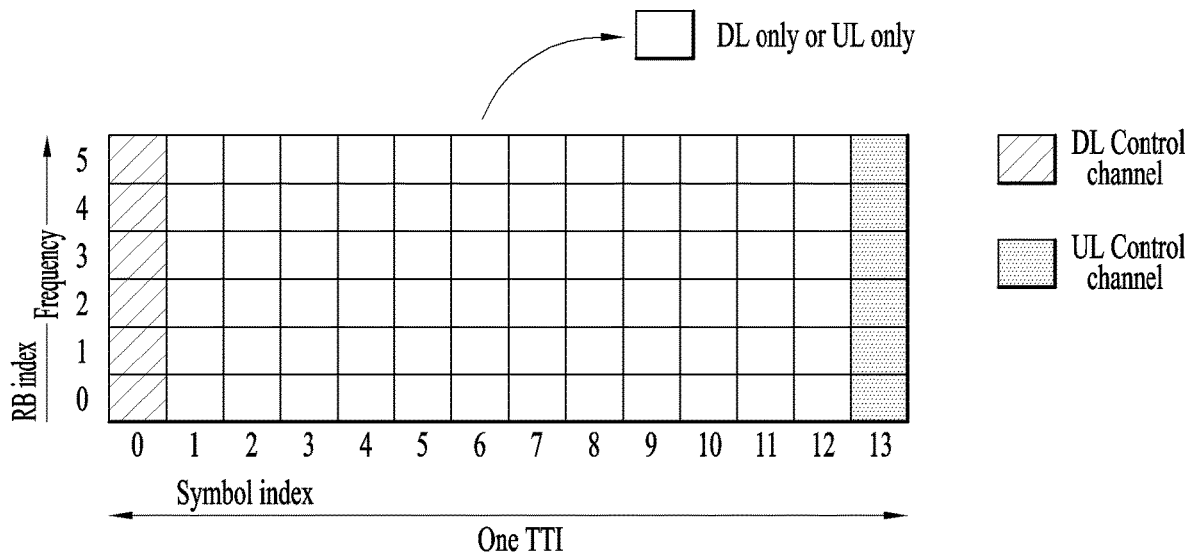
FIG. 2 is a view illustrating an exemplary slot structure available in new radio access technology (NR).

FIG. 2 illustrates an exemplary slot structure available in the new radio access technology (NR).

To minimize a data transmission delay, a slot structure in which a control channel and a data channel are multiplexed in time division multiplexing (TDM) is considered in NR system.

In FIG. 2, an area marked with slanted lines represents a transmission region of a DL control channel (e.g., PDCCH) carrying DCI, and a black part represents a transmission region of a UL control channel (e.g., PUCCH) carrying UCI. DCI is control information which is transmitted from a gNB to a UE, and may include information about a cell configuration that a UE should know, DL-specific information such as DL scheduling, and UL-specific information such as a UL grant. Further, UCI is control information which is transmitted from a UE to a gNB. The UCI may include an HARQ ACK/NACK report for DL data, a CSI report for a DL channel state, a scheduling request (SR), and so on.

In FIG. 2, symbols with symbol index 1 to symbol index 12 may be used for transmission of a physical channel (e.g., PDSCH) carrying DL data, and also for transmission of a physical channel (e.g., PUSCH) carrying UL data. Referring to FIG. 2, DL transmission and UL transmission take place sequentially in one slot, and transmission/reception of DL data and reception/transmission of a UL ACK/NACK for the DL data may be performed in the one slot. Therefore, when an error is generated during data transmission, a time taken for a data retransmission may be reduced, thereby minimizing the delay of a final data transmission.

In slot structure illustrated in FIG. 2, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the NR system, a basic transmission unit is a slot. A slot duration includes 14 symbols each having a normal cyclic prefix (CP), or 12 symbols each having an extended CP. In addition, a slot is scaled in time by a function of a used subcarrier spacing.

For an NR system under discussion, a technique of using an ultra-high frequency band (for example, a frequency band at or above 6 GHz) is considered in order to transmit data to a plurality of users at a high transmission rate in a wide frequency band. However, the ultra-high frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time are limited to or below B although the number of beam directions is different according to connections between B TXRUs and Q antenna elements.

Figure 3:
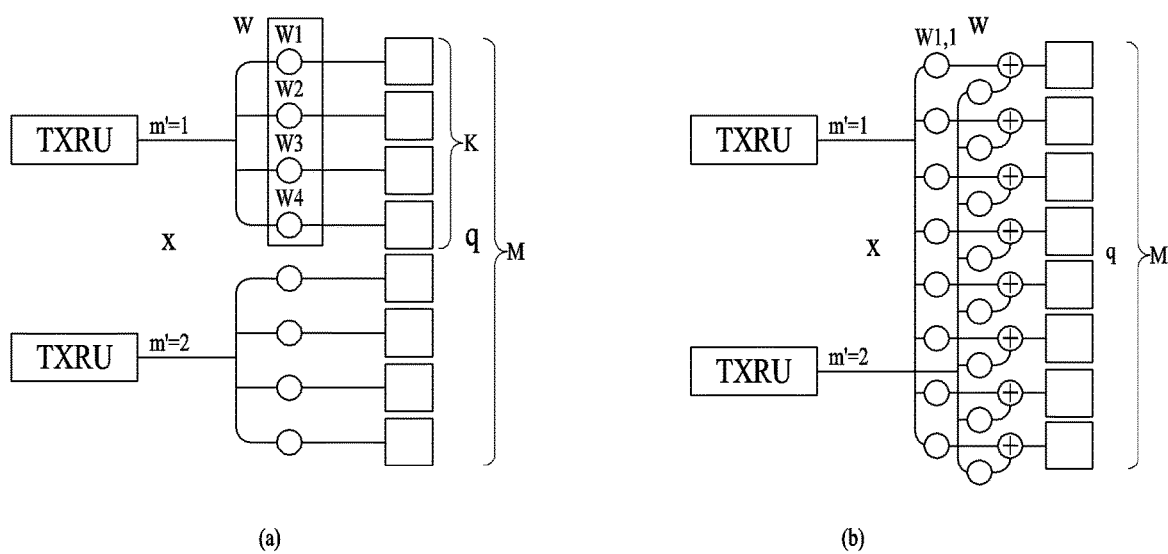
FIG. 3 is a view illustrating exemplary connection schemes between transceiver units (TXRUs) and antenna elements.

FIG. 3 is a view illustrating exemplary connection schemes between TXRUs and antenna elements.

Figure 5:
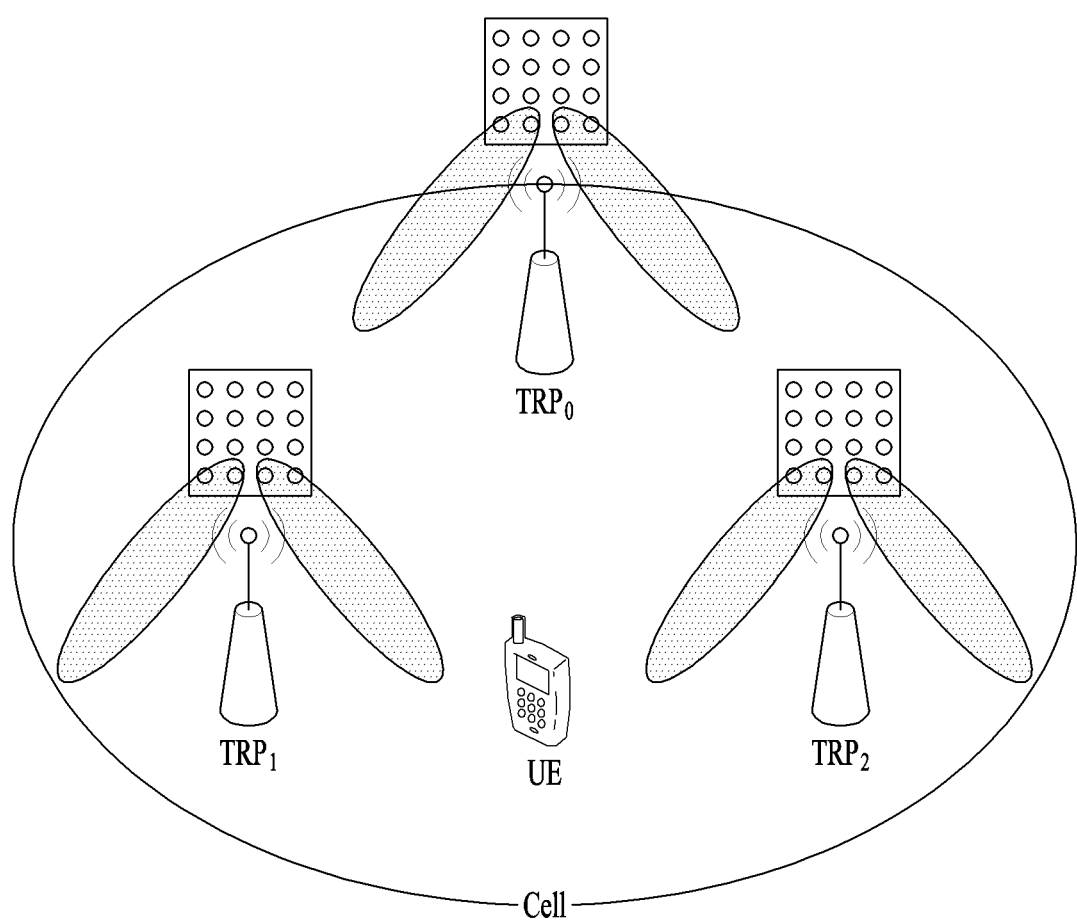
FIG. 5 is a view illustrating an exemplary cell in an NR system.

(a) of FIG. 3 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present disclosure is proposed by reflecting limitations caused by the nature of analog BF or hybrid BF.

Figure 4:
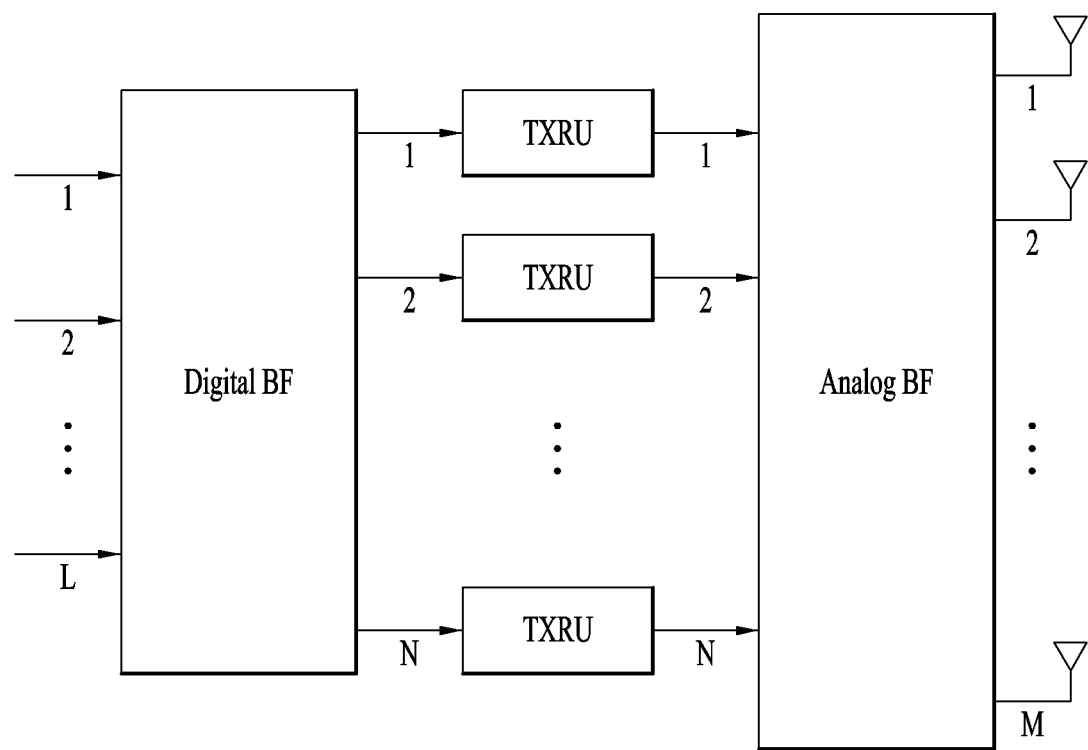
FIG. 4 is a view abstractly illustrating a hybrid beamforming structure in terms of TXRUs and physical antennas.

FIG. 4 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix.

In FIG. 4, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered.

In the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

FIG. 5 is a view illustrating an exemplary cell in the NR system.

Referring to FIG. 5, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system.

Figure 6:
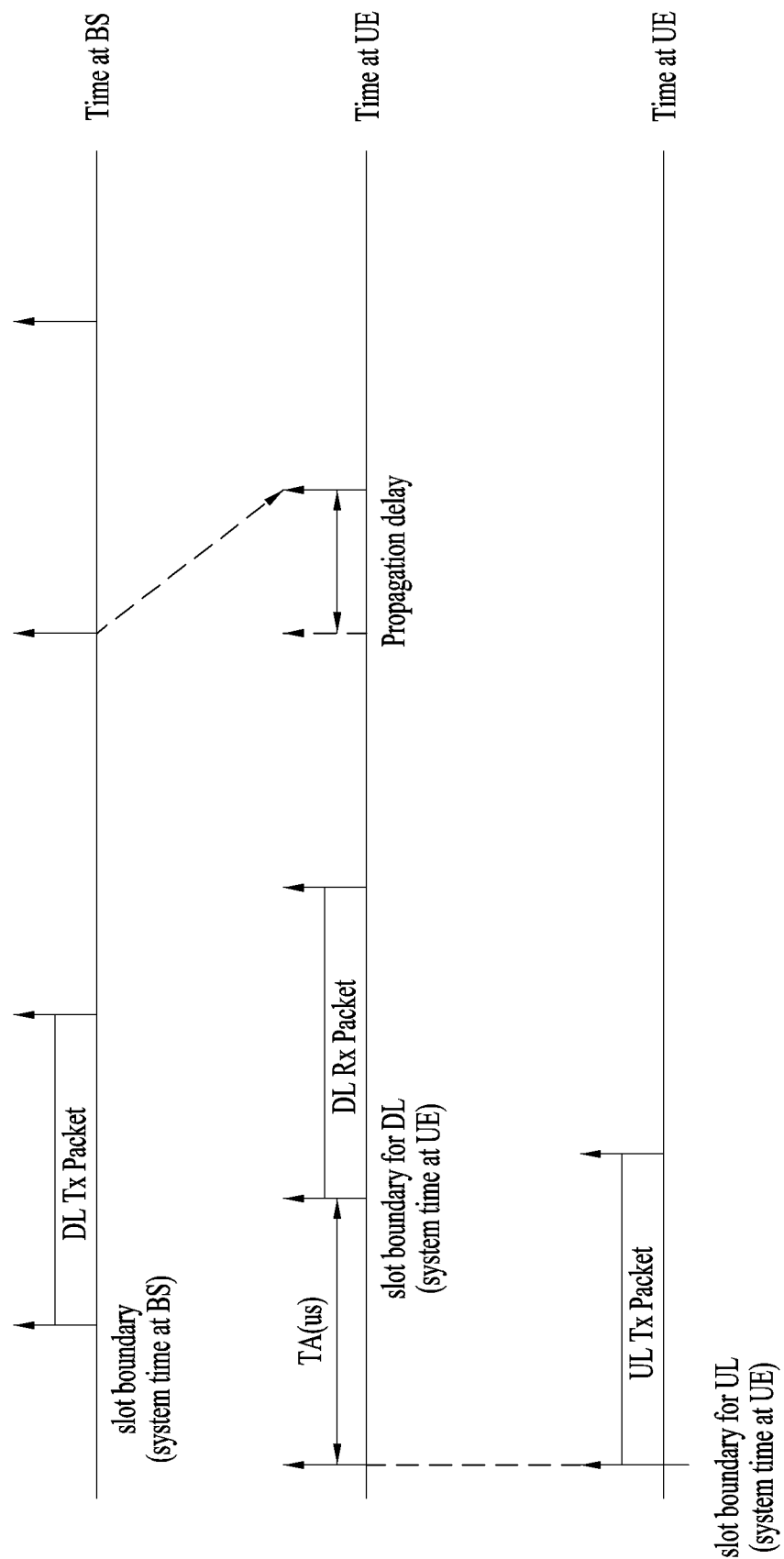
FIG. 6 is a conceptual diagram illustrating a method for allowing a user equipment (UE) to transmit an uplink (UL) signal on the basis of a timing advance (TA) value.

FIG. 6 is a conceptual diagram illustrating a method for allowing a user equipment (UE) to transmit an uplink (UL) signal on the basis of a timing advance (TA) value.

The mobile communication system should provide services to a plurality of UEs in a single frequency band, such that various methods for identifying the UEs from one another are needed. Specifically, differently from downlink through which signals of all UEs can be transmitted by synchronizing with the same reference time, UEs for use in uplink are unable to have the same reference time such that a method for multiplexing the UEs on uplink is needed.

In the case of using CDMA communication such as in the 3G system, a base station (BS) may be designed to identify different UEs using different codes. A base station (BS) for use in the 4G system may be designed to identify different UEs by independently allocating resources on a frequency axis or a time axis. In this case, in order to allow the BS to dynamically schedule resources on the time axis, a plurality of UEs must adjust an arrival time of an uplink (UL) signal on the basis of a signal reception time at which the UEs have received signals from the BS.

In order to maintain UL time synchronization, the BS may transmit a time advance (TA) value to each UE, and the UE may advance or delay a transmission (Tx) time point based on the TA value received from the BS. The BS may calculate the TA value of the UE using various methods, and may transmit the calculated TA value to the UE. In this case, the TA value may be transmitted through a Timing Advance Command (TAC), and the TA command may refer to information indicating the TA value. The TA command may be transmitted through a random access response (RAR), or may be periodically transmitted through a Medium Access Control (MAC) Control Element (CE). The UE of the idle mode may receive the TA command through RAR, and a UE of a connected mode may receive the TA command through RAR or MAC CE. One case in which the UE receives the TA command through RAR and the other case in which the UE receives the TA command through MAC CE will hereinafter be described in detail.

For example, if the UE receives the TA command through RAR and transmits a random access preamble to the BS, the BS may calculate the TA value on the basis of the random access preamble received from the UE. The BS may transmit a random access response (RAR) including the calculated TA value to the UE, and may update an UL Tx time point using the received TA value.

The random access response (RAR) may include a TA command, a UL grant, and a temporary C-RNTI.

The UL grant may include uplink resource allocation information and a transmit power command (TPC) for use in transmission of a scheduling message. TPC may be used to decide Tx power for the scheduled PUSCH. The UE may transmit a scheduled message to the BS according to the UL grant contained in the random access response (RAR). In accordance with one embodiment, a random access preamble, a random access response (RAR) message, and a scheduled message may be referred to as 'M1 message', 'M2 message', and 'M3 message', respectively. 'M1 message', 'M2 message', and 'M3 message' may also be referred to as 'Message 1 (Msg1)', 'Message 2 (Msg2)', and 'Message 3 (Msg3)', respectively.

In addition, when the UE receives the TA command through MAC CE, the BS may periodically or arbitrarily receive a sounding reference signal (SRS) from the UE, and may calculate the TA value of the UE on the basis of the received SRS. The BS may inform the UE of the calculated TA value through the MAC CE. In this case, a periodic TA command transmitted through MAC CE may include a value that is updated on the basis of the previous TA value. For example, assuming that the previous TA value is '100 Ts' and a TA value indicated by the TA command that has been transmitted through the MAC CE is '−16 Ts', the UE may determine '84 Ts (100 Ts−16 Ts)' to be a TA value for UL signal transmission. The UE may transmit the UL signal on the basis of 84 Ts.

Therefore, in the LTE system, the BS may transmit the TA value to the UE, and the UE may advance a scheduled time by the TA value received from the BS and then transmit the UL signal at the advanced time.

Referring to FIG. 6, UEs may be synchronized in time with the BS using a reference signal (e.g., a synchronization signal and a CRS for use in the LTE system) that is transmitted on downlink. In this case, the synchronization time at which each UE is synchronized with the BS may be different from the actual BS time by a predetermined time. For example, the synchronization time at which each UE is synchronized with the BS may be different from the actual BS time by a propagation delay, and the propagation delay may refer to a delay time to be consumed for radio waves moving by a distance between the BS and the UEs. Therefore, if UEs transmit the UL signal with respect to the time synchronized with the BS on downlink, a time difference may occur in a duration time during which the UL signal is transferred from each UE to the BS, according to the respective UEs that have transmitted the UL signal. In this case, according to the respective UEs having transmitted the UL signal, a time difference corresponding to a round-trip delay time between the BS and each UE may occur. Therefore, the BS may transmit the TA value to the UE through the TA command in a manner that the UE can transmit the UL signal at an earlier time advanced by the round-trip delay between the BS and the UE.

The TA command may be transmitted through a response message (e.g., a random access response (RAR) message) about the RACH signal transmitted in an initial access process. In the connected mode after completion of the initial access process, the TA command may be periodically transmitted to the UE on the basis of either the SRS received from the UE or a specific value measured through PUSCH/PUCCH.

Generally, if non-transmission or non-reception of the TA command occurs, the UE position may be changed over time such that there is a time difference between UL signal reception time points and the UE may enter the out-of-sync state on uplink. Therefore, if the UE does not receive the TA command for a given time, the UE may perform re-connection to the BS.

The UE generally has mobility, such that the signal Tx time point of the UE may be changed according to movement speed and position of the UE. Therefore, the TA value transferred from the BS to the UE may be valid for a specific time. In order to allow the TA value to be valid for the specific time, a Time Alignment Timer (TAT) may be used.

For example, if the UE receives the TA value from the BS and updates time synchronization (or time alignment), the UE may initiate the time alignment timer (TAT) or may restart the TAT. The UE may transmit the UL signal only during operation of the TAT. The TAT value may be transmitted from the BS to the UE through system information or a radio resource control (RRC) message such as a radio bearer reconfiguration (RBR) message.

If the TAT has expired or if the TAT does not operate any more, the UE may determine that time synchronization with the BS is incorrect, such that the UE may not transmit any UL signals other than the random access preamble.

In the LTE system, in order to apply an independent TA to each serving cell, a TA group (TAG) may be defined. The TA group (TAG) may include one or more cells to which the same TA is applied. TA may be applied to each TA group, and the time alignment timer may also operate for each TA group.

The TA command for the TA group may indicate an uplink timing change about a current UL timing for each TA group using a multiple of 16 Ts. In the case of random access response (RAR), 11-bit TA command ($T_A$) for the TA group may indicate a value of $N_{TA}$ using an index value of $T_A$. If a UE is configured in a secondary cell group (SCG), the $T_A$ index value may be any of 0, 1, 2, . . . , 256. If the UE is configured in a primary cell group (PCG), the $T_A$ index value may be any of 0, 1, 2, . . . , 1282. In this case, the TA value for the TA group may be given as '$N_{TA}=16TA$'.

In accordance with another embodiment, a 6-bit TA command for the TA group may indicate that, for the $T_A$ index value, a current $N_{TA}$ value ($N_{TA,old}$) is adjusted using a new $N_{TA}$ value ($N_{TA,new}$). In this case, the $T_A$ value may be any of 0, 1, 2, . . . , 63, and $N_{TA,new}$ ≒ may be denoted by '$N_{TA,old}+(T_A-31)\times 16$'. In this case, the operation for adjusting the $N_{TA}$ value to be a positive (+) number or a negative (−) number may indicate that the UL Tx time point for the TA group may be advanced or delayed by a given magnitude.

If the TA command is received on the N-th subframe, adjusting the UL Tx time point corresponding to the received TA may be applied to subframes starting from the (N+6)-th subframe. In association with the serving cells of the same TA group, if UL transmission (e.g., PUCCH/PUSCH/SRS) of the UE at the N-th subframe and UL transmission (e.g., PUCCH/PUSCH/SRS) of the UE at the (N+1)-th subframe are overlapped with each other due to time adjustment, the UE may finish transmission of the N-th subframe and may not transmit the overlapped part between the N-th subframe and the (N+1)-th subframe.

If the received DL time point is changed, and if the changed DL time point is not compensated or is partially compensated by UL timing adjustment without using the TA command, the UE may change the $N_{TA}$ value according to the changed DL time point.

In addition, although various system bandwidths ranging from 1.4 MHz to 20 MHz are defined in the LTE system, a single numerology of 15 kHz (hereinafter the term "numerology" may refer to subcarrier spacing) may be defined in the subcarrier spacing (SCS). In addition, the cyclic prefix (CP) length may be defined based on the 15 kHz subcarrier spacing, and may be equally defined in all system bandwidths.

The UE may basically support all system bandwidths, and the sampling frequency may be set to any of 1.92~30.72 MHz according to system bandwidths. Under the environment in which various system bandwidth are defined, the UE does not recognize the BS system bandwidth in the initial access process, such that the UE may attempt to access the BS on the basis of either a minimum bandwidth defined in a frequency band currently connected to the UE or a minimum bandwidth supported by the LTE system. In this case, the UE may operate a transceiver (or a Tx/Rx module or a communication module) using the sample frequency of 1.92 MHz, such that it is preferable that the TA command transmitted by the BS be applied in units of 16 $T_s$. In this case, $T_s$ is 1/30.72 MHz, and may correspond to a minimum sampling time defined by the LTE system. That is, 16 $T_s$ may refer to the sampling time corresponding to the sampling frequency 1.92 MHz. Therefore, in order for the LTE system to allow TA-associated resolution in the initial access to be identical to TA-associated resolution in the connected mode, a basic unit of the TA value may be defined as 16 $T_s$. In this case, the CP length is about 5 usec, and the same CP length is used in all system bandwidth. Therefore, an unexpected error corresponding to about 1/18 CP length may occur in time adjustment of UL transmission (UL Tx time adjustment) through TA, irrespective of the system bandwidth.

In the NR system, it is expected that a basic initial access process and a UL Tx time adjustment using the TA will be similar to those of the LTE system. However, differently from the LTE system, the NR system may use various frequency bands ranging from several hundreds of MHz to several tens of GHz, and may also use different usage cases or different cell environments according to individual frequency bands. Therefore, the NR system may support various numerologies (e.g., subcarrier spacing of 15, 30, 60, 120 or 240 kHz on the basis of a data channel). In addition, various numerologies are supported, such that various CP lengths may be defined, and the CP length is generally determined in inverse proportion to the subcarrier spacing. In addition, the NR system may allow the respective UEs to use different numerologies according to services operating in a single system bandwidth. If different numerologies are used for the respective UEs, the LTE system operation for interpreting the TA value transmitted through the TA command on the basis of only one basic unit may be considered inefficient in terms of signaling overhead. Therefore, the present disclosure may provide a method for configuring the basic unit of the TA value according to numerologies. In this case, the basic unit of the TA value may be commonly applied to an absolute TA value (e.g., a TA value transmitted through a random access response (RAR) message and a TA value transmitted through a TA command in the connected mode).

1. Method 1: Method for Configuring Basic Unit of TA Value According to Subcarrier Spacing of SS Block The NR system may support a wider frequency band as compared to the LTE system. Therefore, the NR system has a much larger difference in frequency offset according to frequency bands as compared to the LTE system, such that the subcarrier spacing of a synchronization signal (SS) block for use in the NR system is defined according to the frequency bands such that time and frequency synchronization can be efficiently carried out in the NR system using the defined subcarrier spacing of the SS block.

A large subcarrier spacing of the SS block may indicate that a frequency bandwidth of a data channel transmitted in the corresponding frequency band is very large. In this case, since the CP length is shortened in inverse proportion to the subcarrier spacing, the basic unit ($T_{TA}$) of the TA value may be configured according to the subcarrier spacing of the SS block. In this case, $T_{TA}$ may be determined in inverse proportion to the subcarrier spacing of the SS block, or may be determined on the basis of the rule predefined according to the subcarrier spacing of the SS block. If necessary, $T_{TA}$ may also be determined to be an arbitrary value according to one embodiment.

For example, assuming that the subcarrier spacing of the SS block is set to 15 kHz, $T_s$ may be 1/30.72 MHz, and $T_{TA}$ may be 4 Ts. In addition, assuming that the subcarrier spacing of the SS block is 120 kHz, $T_s$ may be 1/(8×30.72 MHz), and $T_{TA}$ may be 4 $T_s$. In the above-mentioned examples, assuming that $T_s$ is set to a fixed value, the value of N for use in '$T_{TA}=N \times T_s$' may be scaled on the basis of the $T_s$ value. That is, assuming that $T_s$ value is fixed to '1/(16× 30.72 MHz)', when the subcarrier spacing of the SS block is 15 kHz, $T_{TA}$ may be 32 $T_s$, and when the subcarrier spacing of the SS block is 120 kHz, $T_{TA}$ may be 4 $T_s$.

2. Method 2: Method for Configuring Basic Unit of TA Value According to Frequency Band According to a detailed method proposed in Method 1, it is assumed that subcarrier spacing of all channels is very large according to carrier frequencies managed and operated by a base station (BS), such that the SS block is defined as a representative channel of all channels. However, according to the latest research and discussion known to those skilled in the art, the NR system may have a minimum system bandwidth of 5 MHz within the range of 6 GHz or less, and may have a minimum system bandwidth of 50 MHz within the range of 6 GHz or higher.

If the subcarrier spacing of the SS block (i.e., the SS block subcarrier spacing) is set to 15 kHz, this means that a frequency band of the SS block corresponds to about 4 MHz. Therefore, although the subcarrier spacing of the SS block for use in the frequency band of 3~6 GHz is set to 15 kHz, the subcarrier spacing of a data channel may be 30 kHz or 60 kHz. In addition, as the subcarrier spacing increases, the CP length is reduced. As a result, when $T_{TA}$ is defined on the basis of the subcarrier spacing (SCS) of the SS block in which the subcarrier spacing SCS is small, resolution of the TA value may be extremely decreased. Therefore, it may be more desirable that the basic unit of the TA value is configured according to the frequency band. In this case, the frequency band may refer to a carrier frequency band, and may also refer to a frequency band number defined in the communication standard.

The following Table 2 exemplarily illustrates subcarrier spacing of the SS block, $T_s$ values, and $T_{TA}$ values according to respective frequency bands.

TABLE 2

| Frequency band | Subcarrier spacing of SS block | $T_S$ | $T_{TA}$ |
|---|---|---|---|
| 300 MHz~3 GHz | 15 kHz | 1/30.72 MHz | $4T_S$ |
| 3 GHz~6 GHz | 15 kHz | 1/(2 × 30.72 MHz) | $4T_S$ |
| 6 GHz~40 GHz | 120 kHz | 1/(8 × 30.72 MHz) | $4T_S$ |
| 40 GHz~100 GHz | 120 kHz | 1/(16 × 30.72 MHz) | $4T_S$ |

Referring to Table 2, as the frequency band increases, the $T_{TA}$ value decreases. Although the same SS block subcarrier spacing is used, the $T_{TA}$ value may be a smaller value at a higher frequency band. In addition, if $T_s$ shown in Table 2 is defined as a fixed value, the N value for use in '$T_{TA}=N \times T_s$' may be scaled according to the $T_s$ value for convenience of description. In other words, assuming that the $T_s$ value is fixed to '1/(16×30.72 MHz)', $T_{TA}$ shown in Table 2 may be sequentially changed to 64 $T_s$, 32 $T_s$, 8 $T_s$, and 4 $T_s$ in the top-to-bottom direction of Table 2.

3. Method 3: Method for Configuring Basic Unit of TA Value According to RACH Numerologies In the LTE or NR system, the UE may initially attempt to perform UL transmission through the RACH preamble during the initial access. In this case, the TA value may be set to zero '0'. 'TA=0' may indicate that the UE transmits the UL signal on the basis of a Rx time of a downlink (DL) signal. In this case, the BS may calculate an arrival time of the RACH preamble signal transmitted from the UE, and may transmit the TA value configured based on the arrival time of the RACH preamble signal to the UE through the RAR message. That is, resolution of the TA value transmitted through the RAR message may be determined by the bandwidth of the RACH preamble signal, and the bandwidth of the RACH preamble signal may be proportional to the subcarrier spacing of the RACH preamble. Therefore, the resolution of the TA value transmitted through the RAR message may be used as $T_{TA}$ corresponding to the basic unit of the TA value that is transmitted through the TA command and is used during UL signal transmission of the UE. $T_{TA}$ may be determined in inverse proportion to the subcarrier spacing of the RACH preamble, or may be determined on the basis of the rule predefined according to the subcarrier spacing of the RACH preamble. Alternatively, $T_{TA}$ may also be set to an arbitrary value according to one embodiment.

The following Table 3 illustrates examples of $T_{TA}$ determined according to the subcarrier spacing of the RACH preamble.

TABLE 3

| Subcarrier spacing of RACH preamble (Subcarrier spacing of RACH msg1) | $T_S$ | $T_{TA}$ |
|---|---|---|
| 15 kHz | 1/30.72 MHz | $8T_S$ |
| 30 kHz | 1/(2 × 30.72 MHz) | $8T_S$ |
| 60 kHz | 1/(8 × 30.72 MHz) | $8T_S$ |
| 120 kHz | 1/(16 × 30.72 MHz) | $8T_S$ |

Referring to Table 3, $T_{TA}$ may be determined in inverse proportion to the subcarrier spacing of the RACH preamble. In addition, if $T_s$ shown in Table 3 is defined as a fixed value, the N value for use in '$T_{TA}=N \times T_s$' may be scaled according to $T_s$ for convenience of description. For example, assuming that the $T_s$ value is fixed to '1/491.52 MHz', $T_{TA}$ shown in Table 3 may be sequentially changed to 128 $T_s$, 64 $T_s$, 32 $T_s$, 16 $T_s$ in the top-to-bottom direction of Table 3.

4. Method 4: Method for Configuring Basic Unit of TA Value According to Default Numerology of Data Channel As described above, the NR system may support various numerologies within a single system. For example, the NR system may simultaneously support data channels (e.g., PDSCH, PUSCH, etc.) having different subcarrier spacings of 15 kHz~60 kHz within the single system. However, although the NR system simultaneously supports data channels having different subcarrier spacings, the subcarrier spacing of some channels (e.g., SS block, RACH, etc.) used before a common signal commonly used in UEs or UE-to-UE connection is established may be unavoidably fixed to only one value. In this case, assuming that numerology of a signal such as SS block or RACH is used as a reference channel or a reference signal, the TA resolution may be extremely deteriorated or increased. In this case, the reference channel or the reference signal may refer to a channel or signal to be used for TA measurement.

According to the latest research or discussion, default numerology of the data channel is not yet defined in the NR system. However, assuming that the default numerology of the data channel is defined, the default numerology of the data channel may be used as a reference value for deciding the $T_{TA}$ value. This means that the $T_{TA}$ value can be determined according to the default numerology of the data channel. Alternatively, according to the concept similar to the default numerology of the data channel, numerology of a PDSCH used to transmit a broadcast channel (e.g., Remaining Minimum System Information (RMSI), Other System Information (OSI), or paging) or numerology of a PUSCH used to transmit a RACH message3 (RACH msg3) may also be used as a reference value for deciding the $T_{TA}$ value. Assuming that PDSCH numerology or PUSCH numerology is used as a reference value for deciding the $T_{TA}$ value, this means that the $T_{TA}$ value may also be configured according to PDSCH numerology or PUSCH numerology as necessary. In this case, the $T_{TA}$ value may be determined in proportion to the subcarrier spacing of the default numerology of the data channel, or may be determined on the basis of the rule predefined according to the subcarrier spacing of the default numerology of the data channel. Alternatively, the $T_{TA}$ value may also be set to an arbitrary value according to one embodiment as necessary.

The following Table 4 illustrates exemplary $T_{TA}$ values configured according to RMSI numerology.

TABLE 4

| Subcarrier spacing of RMSI | $T_S$ | $T_{TA}$ |
| --- | --- | --- |
| 15 kHz | 1/30.72 MHz | $4T_S$ |
| 30 kHz | 1/(2 × 30.72 MHz) | $4T_S$ |
| 60 kHz | 1/(8 × 30.72 MHz) | $4T_S$ |
| 120 kHz | 1/(16 × 30.72 MHz) | $4T_S$ |

Referring to Table 4, as an example of the broadcast channel, $T_{TA}$ may be set to different values according to the RMSI subcarrier spacing, and $T_{TA}$ may be determined in inverse proportion to the RMSI subcarrier spacing. In addition, if $T_s$ shown in Table 4 is defined as a fixed value, the N value for use in '$T_{TA}=N \times T_s$' may be scaled according to $T_s$ for convenience of description. For example, assuming that the Ts value is fixed to '1/491.52 MHz', $T_{TA}$ shown in Table 4 may be sequentially changed to 64 $T_s$, 32 $T_s$, 16 $T_s$, 8 $T_s$ in the top-to-bottom direction of Table 4.

5. Method 5: Method for Configuring Basic Unit of TA Value Through System Information As described above, the NR system may simultaneously support data channels having different subcarrier spacings of 15 kHz-60 kHz within the single system. In this case, the subcarrier spacing of some channels (e.g., SS block, RACH, etc.) used before a common signal commonly used in UEs or UE-to-UE connection may not represent a preferred subcarrier spacing desired by a connected BS. In this case, the BS may directly configure the $T_{TA}$ value through system information. In addition, the BS may configure a preferred SCS or a supported maximum SCS, and may also configure the $T_{TA}$ value according to the preferred SCS or the supported maximum SCS. If the UE is assigned a plurality of carriers or a plurality of bandwidth parts, the UE may receive system information for each carrier or system information for each bandwidth part through a UE-specific message, such that the $T_{TA}$ value may be configured per carrier or per bandwidth part.

6. Method 6: Method for Configuring Basic Unit of TA Value According to Numerology of Data Channel Configured Per UE or According to Numerology of Reference Channel for TA Measurement The above-mentioned methods 1~5 have assumed that a basic unit of the TA value based on the RAR message is identical to a basic unit of the TA value of the TA command received in a connected mode. Therefore, the concepts of Methods 1~5 have been designed in a manner that $T_{TA}$ is configured on the assumption that all UEs use the same subcarrier spacing. In Methods 1~5, if all UEs do not use the same subcarrier spacing, the $T_{TA}$ value may be determined based on a maximum subcarrier spacing currently supported by the BS so as to implement efficient timing alignment.

Assuming that the basic unit of the TA value based on the RAR message is identical to the basic unit of the TA value of the TA command received in the connected mode, the TA resolution may be deteriorated according to UEs, or it is necessary for the number of bits for transmitting the TA value to be increased to support the maximum subcarrier spacing.

In order to address the above-mentioned issues, Method 6 provides a method for configuring the basic unit of the TA value according to numerology of a data channel configured per UE or according to numerology of a reference channel for TA measurement. In addition, Method 6 may include a method for allowing the basic unit of the TA value received through the RAR message to be different from the basic unit of the TA value received through the TA command in the connected mode.

For example, if the UE is in an idle mode (i.e., before the UE finishes connection setup), $T_{TA}$ may be configured using Methods 1~5.

However, if the UE is in the connected mode (i.e., after the UE finishes the connection setup), the UE may configure the SCS of the data channel (e.g., PDSCH or PUSCH) or the SCS of the reference channel (e.g., SRS) for TA measurement, and may determine the $T_{TA}$ value on the basis of the SCS of the data channel or the SCS of the reference channel for TA measurement. In addition, if DL subcarrier spacing is difference from UL subcarrier spacing, $T_{TA}$ may be determined based on the UL subcarrier spacing.

In addition, if the UE is allocated a plurality of carriers or a plurality of bandwidth parts and operates using the allocated carriers or bandwidth parts, subcarrier spacing of the data channel may be applied in different ways according to the respective allocated carriers. In this case, it may be difficult for Methods 1, 3, 4 and 5 to be equally used in all carriers, and it may be more preferable that different $T_{TA}$ values are applied to individual carriers. (Hereinafter, the term "carrier" may refer to a bandwidth part used in one carrier for convenience of description) In this case, $T_{TA}$ may be decided based on the SCS of the allocated data channel, or may be directly decided through a connection setup message. Alternatively, according to one embodiment, the $T_{TA}$ value configured before the connection setup process may also be successively used as necessary.

In Methods 1~5, the TA value may have the same TA resolution about a single frequency band. Therefore, when the UE stores the TA value received through the RAR message in a memory and then receives the other TA value decided as a relative value in the connected mode, the UE may use the addition or subtraction operation using the TA value stored in the memory without using the scaling process.

In contrast, in Method 6, the UE must adjust the TA value configured through the RACH procedure according to the subcarrier spacing (SCS) of the data channel, and must then use the adjusted TA value. Therefore, if the UE stores the TA value received through the RAR message and the SCS of the data channel is decided, the UE may shift the TA value stored in the memory by a predetermined value corresponding to the ratio of the SCS. In this case, 1-bit resolution about the memory may be $T_{TA}$ corresponding to the RAR message.

In accordance with another embodiment, the UE may determine the bit resolution of the memory according to either a frequency band or a maximum SCS supported by the system. According to the bit resolution of the memory, the UE may perform scaling of the TA value received through the RAR message or the TA value received through the TA command in the connected mode, and may then store the scaled TA value in the memory.

Method for Deciding Basic Unit of TA Value for Use in System Operating Through a Plurality of Frequency Bands How to apply the above-mentioned method for configuring the basic unit of the TA value to a communication system capable of providing services through a plurality of frequency bands will hereinafter be described in detail. For example, in the case of using the LTE system, a communication system capable of providing services through a plurality of frequency bands may include the concept of carrier aggregation. The NR system may include the concept of carrier aggregation or the concept of a plurality of bandwidth parts (i.e., multiple bandwidth parts). That is, under the condition that the UE is allocated a plurality of frequency bands and the respective frequency bands have different reference channels for configuring the basic unit of the TA value, a method for determining the basic unit of the TA value on the above condition will hereinafter be described in detail. In this case, it is assumed that the TA command is transmitted through only one frequency band from among plural frequency bands allocated to the UE, all the frequency bands will hereinafter be referred to as a TA group (TAG).

Although the basic unit of the TA value is the SCS of the data channel allocated to the UE or the SCS of the SRS for TA measurement for convenience of description, sub carrier spacing values of all the aforementioned reference channels may also be applied to the present disclosure without departing from the scope or spirit of the present disclosure.

The basic unit of the TA value may be determined on the basis of the SCS of the frequency band (i.e., reference channel) transmitting the TA command from among a plurality of channels. If the UE receives the TA command, the TA value may be determined based on the received TA command. In this case, the TA value may be calculated as an absolute time, or may also be calculated as a UE-adjusted value that is adjusted according to a basic unit (e.g., the number of samples) decided by the UE. The decided TA value may be applied to all frequency bands.

In order to facilitate TA measurement of the BS, if the UE transmits a channel such as SRS to the BS, the UE may assist the TA measurement of the BS by transmitting the SRS through the frequency band capable of transmitting the TA command. However, the scope or spirit of the present disclosure is not limited thereto. In accordance with one embodiment, the BS may directly configure the frequency band needed for SRS transmission in response to BS load or accuracy of TA value measurement.

If the frequency band for configuring the basic unit of the TA value operates with a small subcarrier spacing (SCS) and the basic unit of the TA value is decided according to the small SCS, the basic unit of the TA value may be extremely increased. Therefore, in the frequency band in which the operating SCS is large and the slot length is short, the TA is used as a larger unit than the slot length, interference between symbols may occur.

In order to address the above-mentioned issues, the basic unit of the TA value may be determined based on the SCS of the frequency band in which the SCS of a reference channel is at the highest value, from among several frequency bands allocated as a reference for deciding the basic unit of the TA value. Upon receiving the TA command, the UE may decide the TA value on the basis of the received TA command, and may apply the decided TA value to all the frequency bands. In this case, the reference channel may include various channels or signals as described above.

For example, if several frequency bands are allocated to the UE, since the UE has already entered the connected mode, it is preferable that PUSCH/PUCCH or SRS to which TA is applied be used as a reference channel. Therefore, from among several frequency bands to which the UL channel is allocated, a channel/signal in which the SCS of PUSCH/PUCCH or the SCS of SRS is at the highest value may be set to a reference channel, and the SCS of the reference channel may be used as a reference value for determining the basic unit of the TA value. If the SCS of the reference channel is used as a reference value for determining the basic unit of the TA value, this means that the basic unit of the TA value can be configured on the basis of the SCS of the reference channel.

In addition, in the case of using the frequency band in which no UL channel is allocated, the basic unit of the TA value may be configured on the basis of the SCS of the PDSCH/PDCCH channels. In the case of using the frequency band in which the UL channel is allocated, the basic unit of the TA value may be configured on the basis of the highest value from among subcarrier spacings (SCSs) of PUSCH/PUCCH or SRS.

Alternatively, in the frequency band in which no UL channel is allocated, the basic unit of the TA value may also be configured in consideration of the possibility of UL channel allocation in a subsequent process as necessary. For example, in association with the frequency band in which no UL channel is allocated, the basic unit of the TA value may be configured on the basis of the SCS of a given channel shown in Methods 1 to 4. In association with the frequency band in which the UL channel is allocated, the highest value from among SCS values of PUSCH/PUCCH or SRS may be configured as the basic unit of the TA value.

Alternatively, even when no UL channel is allocated, in consideration of the possibility of UL channel allocation in a subsequent process, the basic unit of the TA value about all the configured frequency bands may be configured on the basis of the highest value from among SCS values of a given channel shown in Methods 1 to 4.

In order to facilitate TA measurement of the BS, if the UE transmits a channel such as SRS to the BS, it may be preferable that the UE transmits the SRS through a frequency channel determined to be the reference channel. However, according to one embodiment, the same channels having the same SCS may be present, and the BS may directly configure the frequency band for SRS transmission in consideration of BS load or accuracy of TA measurement.

Figure 7:
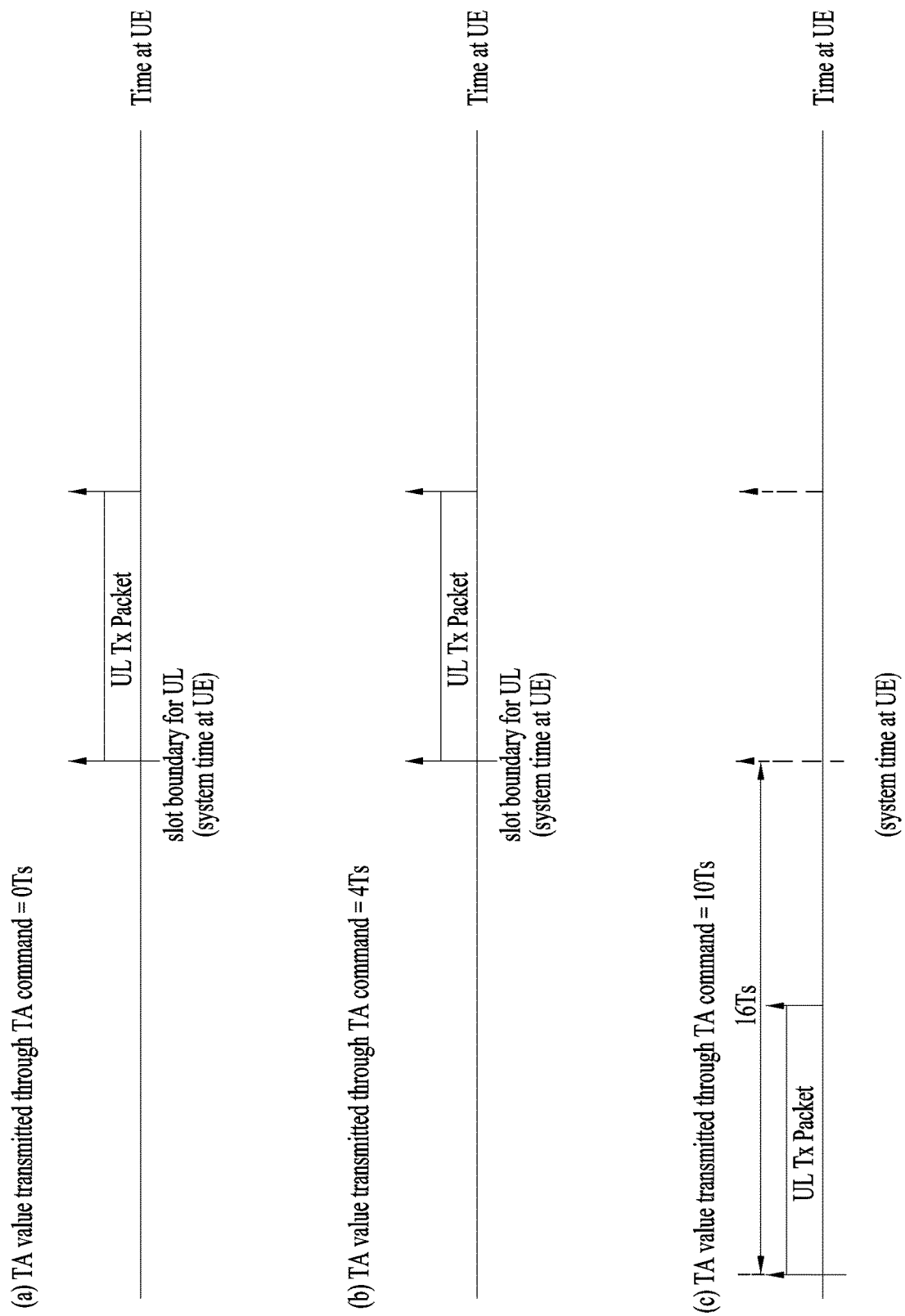
FIG. 7 is a conceptual diagram illustrating exemplary methods for applying a round-off or round-up operation to a TA value that is calculated on the basis of the number of samples.

FIG. 7 is a conceptual diagram illustrating exemplary methods for applying a round-off or round-up operation to the TA value that is calculated on the basis of the number of samples.

If different sampling frequencies operate in the respective frequency bands, and if the UE calculates the TA value received from the TA command on the basis of the number of samples and applies the calculated TA value, the UE may perform scaling of the TA value received from the TA command according to each sampling frequency, may perform conversion of the scaled TA value on the basis of the number of samples, and may use the conversion resultant value. In this case, if the conversion resultant value based on the number of samples does not correspond to an integer number about the sampling time, the UE may use the nearest integer number. In this case, the UE may use a round-off or round-up operation as necessary so as to use the nearest integer number. For example, as shown in FIG. 7, assuming that the basic unit of the TA value may be set to 16 $T_s$ and the TA value received by the UE through the TA command is 4 $T_s$, the UE may apply the TA value obtained by the round-off operation. In this case, since 4 $T_s$ is less than 8 $T_s$ corresponding to ½ of 16 $T_s$, the applied TA value may be zero '0'. Therefore, the UE may transmit the UL signal without adjusting the UL Tx time point. If the TA value received by the UE through the TA command is 10 $T_s$, 10 $T_s$ is higher than 8 $T_s$ corresponding to ½ of 16 $T_s$, such that 16 $T_s$ may be used as the TA value using the round-up operation, and the UE may adjust a UL Tx time point by 16 $T_s$ and then transmit the UL signal at the adjusted Tx time point.

In accordance with another embodiment, the round-up or round-down operation may also be applied to such TA calculation. For example, assuming that the basic unit of the TA value is set to 16 $T_s$ and the TA value is calculated using the round-up operation, when the TA value received by the UE through the TA command is set to 4 $T_s$ or 10 $T_s$, 16 $T_s$ may be used as the TA value according to the round-up operation.

In contrast, assuming that the TA value is changed to an absolute value and the resultant absolute value is used, the UE may apply different TA values to individual frequency bands using the absolute value that has been changed based on an operation unit for each frequency band.

Considerations of UE Operation about Concatenated Mini-Slots

In the meantime, in order to improve (or increase) a data reception (Rx) region during the data Tx/Rx process of a communication system, a method for performing packet transmission in a manner that a packet is concatenated with a plurality of slots may be used in the communication system. In this case, within each slot, a reference signal (S) for channel estimation may be transmitted to demodulate or recover data from a received signal, the UE may perform channel estimation using the RS and may receive signals using the RS. In this case, if a transmitter (e.g., UE) performs time tracking or abruptly changes a current frequency to another frequency at an intermediate position of the concatenated slots, characteristics of a channel corresponding to each slot may be changed from the viewpoint of a receiver (e.g., BS). Therefore, considering the above-mentioned case, the channel estimated in each slot is generally applied only to the estimated slot without being applied to a subsequent or previous slot.

If a request for packet transmission occurs in the LTE or NR system, the LTE or NR system aims to define a mini-slot in which the data channel for data transmission has a short slot so as to reduce a time delay needed for data transmission, as well as to provide a low latency service using the mini-slot. Since the mini-slot has a short slot length, spacing in time between slots is small. However, if RS is transmitted per slot, the ratio of overhead may extremely increase. As a result, when data transmission is performed using concatenated slots, many developers and companies are conducting intensive research into various methods for allowing the RS having been used in one slot to be successively used in the subsequent or previous slot, without transmitting the RS for each slot.

As described above, assuming that the RS is shared by several slots, if the transmitter performs time tracking at a boundary position of concatenated slots, the receiver does not recognize such time tracking of the transmitter, performs channel estimation at the slot in which the RS has been transmitted, and applies the channel estimation result to contiguous slots, such that the data Rx performance may be greatly deteriorated. In order to address the above-mentioned issues, the present disclosure provides a method for allowing the UE to receive the TA command as well as to apply a TA value received through the TA command, and a detailed description thereof is as follows.

First, if the UE is allocated concatenated mini-slots by sharing the RS in the process for receiving the TA command and applying the TA value received through the TA command to the transmitter of the UE, the UE may not apply the TA value to transmission of concentrated mini-slots so as to decide a Tx time point of the transmitter. The UE may use the TA value as a parameter of the transmitter, after transmission completion of concatenated mini-slots. In addition, although a time at which application of the TA value is started is predefined, the UE may delay the TA value and may use the delayed TA value. Therefore, the UE can receive a transmission (Tx) packet without any problems.

Second, the BS having transmitted the TA command and the UE configured to receive the TA command and apply the TA value to the received TA command may predefine a TA application time at which the TA value will be applied. If transmission of the concatenated mini-slots is attempted, accurate application of the TA value is possible. Therefore, the BS may accurately apply the TA value to the channel estimation value, such that the resultant value can be applied to the data reception process. In this case, a specific time at which the TA value will be applied for mini-slot transmission may be defined in units of a slot or symbol (e.g., OFDM symbol for use in the OFDM symbol) used to define the mini-slot.

Alternatively, in order to prevent the UE operation from being complicated, the TA application time may be defined on a basis of a unit larger than the slot unit of the mini-slot. In addition, a restriction method for allowing the BS (transmitting the TA command) to schedule the concatenated mini-slots while simultaneously avoiding the TA application time may also be used. If necessary, the above-mentioned method may not be applied to other concatenated mini-slots not sharing the RS.

As described above, a delay time occurs in the application process of the TA command, and additional TA commands are received during the section having such delay time, such that the accumulated TA value to be finally used may be extremely increased. In this case, if the accumulated TA value is applied at once, the receiver of the BS may receive time tracking information or may have an unexpected problem in data reception. In order to prevent occurrence of such problem, the accumulated TA value may be divisionally applied to a plurality of points. In this case, a reference of classifying the plurality of points may be decided on the basis of pre-configured upper/lower limit values or other upper/lower limit values applied by the BS. In addition, the UE may be arbitrarily applied on the basis of the accumulated TA value, without being applied to individual TA values received through the respective TA commands.

Figure 8:
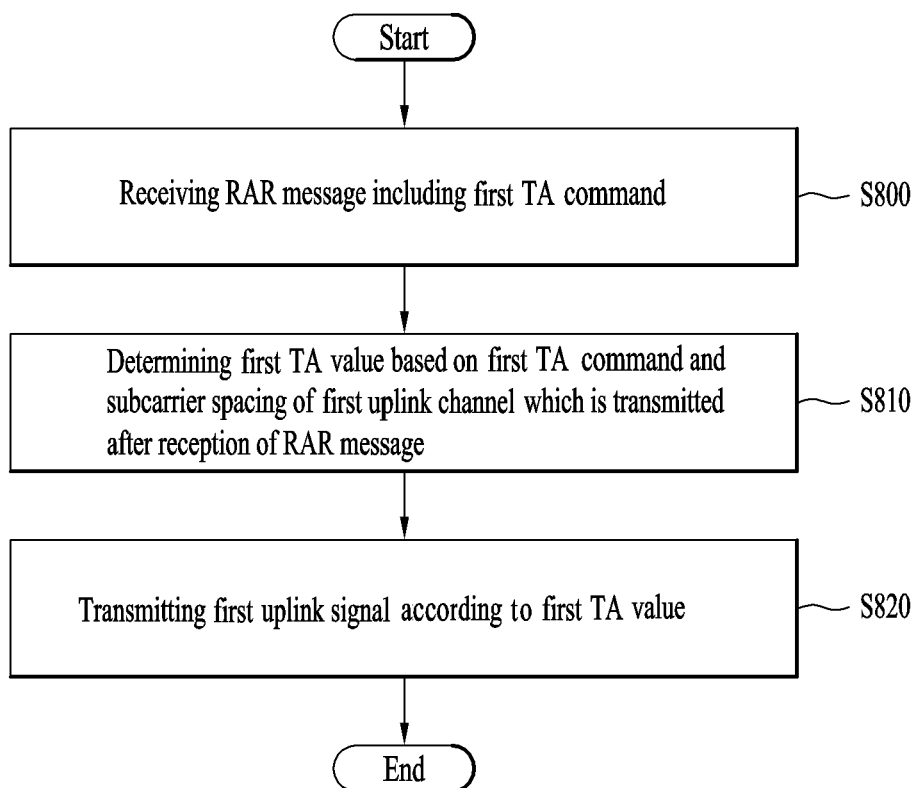
FIG. 8 is a flowchart illustrating an uplink (UL) transmission method according to an embodiment of the present disclosure.

FIG. 8 is a flowchart illustrating a method for allowing the UE to transmit the uplink (UL) according to an embodiment of the present disclosure.

Referring to FIG. 8, the UE may receive a random access response (RAR) message including the first TA command in step S800.

In step S810, the UE may determine a first TA value for transmitting a first UL signal on the basis of not only the subcarrier spacing of the UL channel to be initially transmitted after reception of the RAR message, but also the first TA command.

For example, the basic unit of the TA value may be determined on the basis of the subcarrier spacing of the UL channel to be initially transmitted after reception of the RAR message. In this case, the subcarrier spacing of the RACH msg3 may be recognized by the UE through RACH configuration. The first TA value may be determined on the basis of the basic unit of the TA value and the first TA command. When the UE transmits the UL signal through a single UL carrier, the first TA command may refer to a TA command to be received by the UE through RAR during the idle mode or the connected mode of the UE. In addition, the first TA command may also refer to the TA command received through a MAC CE during the connected mode of the UE. In this case, the first TA value may be in proportion to the value indicated by the first TA command, and may be in inverse proportion to the subcarrier spacing of the UL channel to be initially transmitted after reception of the RAR message.

The UL channel to be initially transmitted after reception of the RAR message may refer to 'RACH msg3' when the UE is in the idle mode, and may refer to a PUSCH when the UE is in the connected mode.

In step S820, the UE may transmit a first UL signal according to the first TA value. In this case, a first UL signal to be transmitted according to the first TA value may include the UL channel to be initially transmitted after reception of the RAR message. For example, the UE in the idle mode may transmit 'RACH msg3' according to the first TA value.

Figure 9:
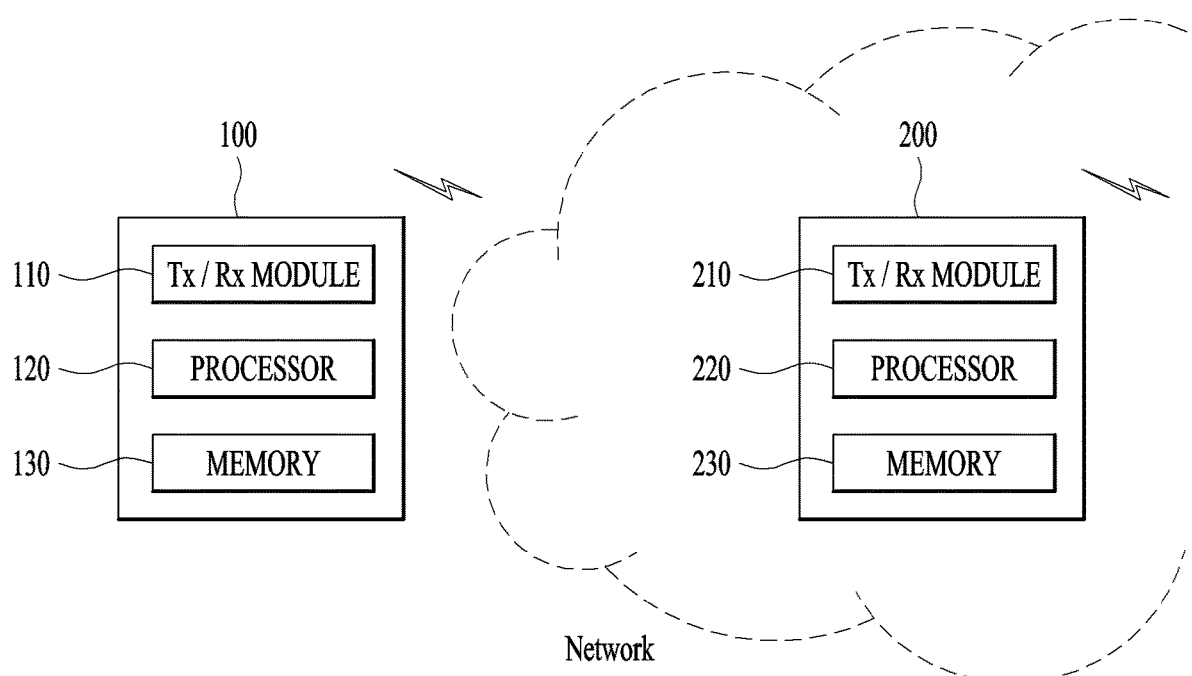
FIG. 9 is a diagram illustrating a configuration of a user equipment (UE) and a base station (BS).

FIG. 9 is a diagram illustrating a configuration of a user equipment (UE) and a base station (BS).

The UE 100 according to the present disclosure may include a transceiver 110, a processor 120, and a memory 130. The transceiver 110 of the UE 100 may be referred to as a radio frequency (RF) unit or a Tx/Rx module. The transceiver 110 may be configured to transmit and receive various signals, data and information to and from an external device. Alternatively, the transceiver 110 may be divided into a transmitter and a receiver. The UE 100 may be connected to the external device by wire and/or wirelessly. The processor 120 may control overall operation of the UE 100, and be configured to calculate and process information for the UE 100 to transmit and receive to and from the external device. In addition, the processor 120 may be configured to perform the proposed operations of the UE 100. The processor 120 may also be configured to control the transceiver 110 to transmit data or messages according to the proposal of the present disclosure. The memory 130 may store the calculated and processed information for a predetermined time, and may be replaced by another constituent such as a buffer (not shown).

Referring to FIG. 9, the BS 200 according to the present disclosure may include a transceiver 210, a processor 220, and a memory 230. If the BS 200 communicates with the UE 100, the transceiver 210 may be referred to as a Tx/Rx module or a radio frequency (RF) unit. The transceiver 210 may be configured to transmit and receive various signals, data and information to and from an external device. The BS 200 may be connected to the external device by wire and/or wirelessly. The transceiver 210 may also be divided into a transmitter and a receiver. The processor 220 may control overall operation of the BS 200, and be configured to calculate and process information for the BS 200 to transmit and receive to and from the external device. In addition, the processor 220 may be configured to perform the proposed operations of the BS 200. The processor 220 may also be configured to control the transceiver 210 to transmit data or messages according to the proposal of the present disclosure. The memory 230 may store the calculated and processed information for a predetermined time, and may be replaced by another constituent such as a buffer (not shown). The BS 200 may be eNB or gNB.

For configuration of the UE 100 and the BS 200, the details described in various embodiments of the present disclosure may be independently applied or implemented such that two or more embodiments are simultaneously applied. For simplicity, redundant description is omitted.

The processor 120 of the UE 100 according to the present disclosure may control the transceiver 110 to receive the RAR message including the first TA command, and may determine the first TA value for transmitting the UL signal based on the first TA command and the subcarrier spacing of the UL channel to be initially transmitted after reception of the RAR message. As described above, when the UE transmits the UL signal through one UL carrier, the first TA command may refer to a TA command to be received through RAR during the idle mode or connected mode of the UE. In this case, the UL channel to be initially transmitted after reception of the RAR message may refer to 'RACH msg3' when the UE is in the idle mode, and may refer to a PUSCH when the UE is in the connected mode. For example, if the UE is in the idle mode, the UE may receive the first TA command through the RAR message, and the first TA value may be determined on the basis of the value indicated by the first TA command and the basic unit of the TA value. In this case, the basic unit of the TA value may be determined based on the subcarrier spacing of 'RACH msg3'.

When the UE is in the connected mode, the UE may receive the first TA command through the RAR message or the MAC CE. In this case, the first TA command transmitted through the MAC CE may refer to a TA command that is periodically transmitted, and may indicate an updated value about the previous TA value. In this case, the first TA value may be determined based on the basic unit of the TA value and the value indicated by the first TA command. When the UE is in the connected mode, the basic unit of the TA value may be determined based on the subcarrier spacing of a PUSCH to be initially transmitted after completion of RAR. In addition, when the UE receives the first TA command through the MAC CE, the first TA value may be determined by applying the value indicated by the first TA command to the previous TA value.

The UE may control the transceiver 110 to transmit the first UL signal according to the first TA value. In this case, the first UL signal to be transmitted according to the first TA value may include the UL channel to be initially transmitted after reception of the RAR message. For example, the UE in the idle mode may transmit 'RACH msg3' according to the first TA value.

In addition, if the UE is allocated a plurality of UL bandwidth parts, the basic unit of the TA value may be determined based on largest value among subcarrier spacing values of the plurality of UL bandwidth parts. For example, the UE may receive a DL channel including a second TA command. In this case, the second TA command may refer to a TA command to be transmitted from the BS when the UE has the plurality of UL bandwidth parts. The UE may determine the second TA value for transmitting the second UL signal based on the second TA command. For example, the second TA value may be determined based on the basic unit of the TA value and the value indicated by the second TA command. If the UE is allocated a plurality of UL bandwidth parts, the basic unit of the TA value may be set to the largest SCS value among SCS values of PUSCH, PUCCH, or SRS in the plurality of UL frequency bands.

In addition, when the UL signal is transmitted in an uplink (UL) bandwidth part, that has a smaller SCS than the SCS used to configure the basic unit of the TA value, among the plurality of UL bandwidth parts, the second TA value may be determined by rounding-off TA-associated information based on the basic unit of the TA value.

The embodiments of the present disclosure may be implemented through various means. For example, the embodiments may be implemented by hardware, firmware, software, or a combination thereof.

When implemented by hardware, a method according to embodiments of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present disclosure may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable not only to 3GPP systems, but also to various wireless communication systems including IEEE 802.16x and 802.11x systems. Moreover, the proposed method can also be applied to mmWave communication using an ultra-high frequency band.

The invention claimed is:

1. A method of transmitting an uplink signal by a user equipment (UE) in a wireless communication system, the method comprising:

receiving a downlink channel including a timing advance (TA) command for performing a TA operation by the UE;

determining a TA value for the TA operation based on (i) the TA command and (ii) a largest value among subcarrier spacing values of a plurality of uplink bandwidth parts of the UE; and transmitting the uplink signal based on the TA value.

2. The method of claim 1, wherein the TA value is configured to (i) increase as an index value indicated by the TA command increases, and (ii) decrease as the subcarrier spacing increases.

3. A user equipment (UE) for transmitting an uplink signal in a wireless communication system, the UE comprising:

a transceiver; and a processor, wherein the processor configured to:

control the transceiver to receive a downlink channel including a timing advance (TA) command for performing a TA operation by the UE;

determine a TA value for the TA operation based on (i) the TA command and (ii) a largest value among subcarrier spacing values of a plurality of uplink bandwidth parts of the UE; and control the transceiver to transmit the uplink signal based on the TA value.

4. The UE of claim 3, wherein the TA value is configured to (i) increase as an index value indicated by the TA command increases, and (ii) decrease as the subcarrier spacing increases.

5. At least one computer-readable memory storing instructions that, when executed, control a user equipment (UE) to perform operations for transmitting an uplink signal in a wireless communication system, the operations comprising:

receiving a downlink channel including a timing advance (TA) command for performing a TA operation by the UE;

determining a TA value for the TA operation based on (i) the TA command and (ii) a largest value among subcarrier spacing values of a plurality of uplink bandwidth parts of the UE; and transmitting the uplink signal based on the TA value.

6. The at least one computer-readable memory of claim 5, wherein the TA value is configured to (i) increase as an index value indicated by the TA command increases, and (ii) decrease as the subcarrier spacing increases.

* * * * *